US007565693B2

(12) United States Patent
Shin et al.

(10) Patent No.: US 7,565,693 B2
(45) Date of Patent: Jul. 21, 2009

(54) NETWORK INTRUSION DETECTION AND PREVENTION SYSTEM AND METHOD THEREOF

(75) Inventors: Seung Won Shin, Taejon (KR); Jintae Oh, Taejon (KR); Ki Young Kim, Taejon (KR); Jong Soo Jang, Taejon (KR); Sung Won Sohn, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 770 days.

(21) Appl. No.: 11/023,384

(22) Filed: Dec. 29, 2004

(65) Prior Publication Data
US 2006/0085855 A1  Apr. 20, 2006

(30) Foreign Application Priority Data
Oct. 19, 2004  (KR) .................... 10-2004-0083752

(51) Int. Cl.
*G06F 11/00* (2006.01)
(52) U.S. Cl. .................... 726/23; 726/4; 726/14; 726/25; 380/255
(58) Field of Classification Search ............ 726/22, 726/23, 25, 4, 14; 380/255
See application file for complete search history.

(56) References Cited

U.S. PATENT DOCUMENTS

| | | | | |
|---|---|---|---|---|
| 6,279,113 B1 * | 8/2001 | Vaidya | .................. | 726/23 |
| 6,321,338 B1 * | 11/2001 | Porras et al. | ................ | 726/25 |
| 6,405,318 B1 * | 6/2002 | Rowland | .................. | 726/22 |
| 6,654,882 B1 * | 11/2003 | Froutan et al. | ............. | 713/153 |
| 7,017,186 B2 * | 3/2006 | Day | .................. | 726/23 |
| 7,058,796 B2 * | 6/2006 | Lynn et al. | ................ | 713/1 |
| 7,086,089 B2 * | 8/2006 | Hrastar et al. | ............... | 726/22 |
| 7,089,592 B2 * | 8/2006 | Adjaoute | .................. | 726/25 |
| 7,234,168 B2 * | 6/2007 | Gupta et al. | ................ | 726/25 |
| 7,260,846 B2 * | 8/2007 | Day | .................. | 726/23 |
| 7,290,283 B2 * | 10/2007 | Copeland, III | ............. | 726/25 |
| 7,293,238 B1 * | 11/2007 | Brook et al. | ................ | 715/736 |
| 7,308,715 B2 * | 12/2007 | Gupta et al. | ................ | 726/23 |
| 7,322,044 B2 * | 1/2008 | Hrastar | .................. | 726/22 |
| 7,401,145 B2 * | 7/2008 | Kang et al. | ................ | 709/225 |

(Continued)

OTHER PUBLICATIONS

Hyang-Ah Kim, et al.; "Autograph: Toward Automated, Distributed Worm Signature Detection"; Intel Research, Carnegie Mellon University.

*Primary Examiner*—Kimyen Vu
*Assistant Examiner*—April Y Shan
(74) *Attorney, Agent, or Firm*—Lowe Hauptman Ham & Berner, LLP

(57) ABSTRACT

The present invention relates to a network intrusion detection and prevention system. The system includes: a signature based detecting device; an anomaly behavior based detecting device; and a new signature creating and verifying device disposed between the signature based detecting device and the anomaly behavior based detecting device, wherein if the anomaly behavior based detecting device detects network-attack-suspicious packets, the new signature creating and verifying device collects and searches the detected suspicious packets for common information, and then creates a new signature on the basis of the searched common information and at the same time, verifies whether or not the created new signature is applicable to the signature based detecting device, and then registers the created new signature to the signature based detecting device if it is determined that the created new signature is applicable.

9 Claims, 4 Drawing Sheets

U.S. PATENT DOCUMENTS

| | | | |
|---|---|---|---|
| 2002/0133721 A1* | 9/2002 | Adjaoute | 713/201 |
| 2003/0154399 A1* | 8/2003 | Zuk et al. | 713/201 |
| 2003/0188190 A1* | 10/2003 | Aaron et al. | 713/201 |
| 2004/0015719 A1* | 1/2004 | Lee et al. | 713/201 |
| 2004/0025044 A1* | 2/2004 | Day | 713/200 |
| 2005/0060579 A1* | 3/2005 | Dickelman et al. | 713/201 |
| 2005/0229254 A1* | 10/2005 | Singh et al. | 726/23 |
| 2006/0101516 A1* | 5/2006 | Sudaharan et al. | 726/23 |
| 2007/0239999 A1* | 10/2007 | Honig et al. | 713/194 |

* cited by examiner

NETWORK INTRUSION DETECTION AND PREVENTION SYSTEM AND METHOD THEREOF

BACKGROUND OF THE INVENTION

1. Field of the Invention

The present invention relates to a network intrusion detection and prevention system and a method thereof, and more particularly, to a network intrusion detection and prevention system and a method thereof in which in case where unknown network intrusion occurs, the network intrusion is detected using an anomaly behavior based detection method and at the same time, a new signature applicable to a signature based detection method is created within a short time on the basis of the detection result and the created new signature is verified, and the verified signature is applied to a signature based detecting system to rapidly prevent the network intrusion.

2. Description of the Related Art

A conventional network intrusion detection and prevention system generally employs a signature based detection method or an anomaly behavior based detection method. At this time, in the signature based detection method, a signature for a well-known network intrusion way is previously prepared and applied to the intrusion detection or prevention system to inspect all of packets on a network one by one in each of system and detect the network intrusion while confirming whether or not the applied signature exists at the packets.

Since the signature based detection method simply compares the packet with the signature, it is used for many network security equipments due to a very high accuracy and high speed of detection. However, the signature detection method has a drawback in that it cannot detect new network intrusion not having the known signature.

Accordingly, in order to solve a drawback of the signature based detection method, the conventional anomaly behavior based detection method is applied to the system. The anomaly behavior based detection method has been developed to detect a new attack, not the known attack. The anomaly behavior based detection method allows an intrusion detection and prevention system to previously identify normal behavior information of a general user, and traces an abnormal network operation to search for the network intrusion and the like in case where the abnormal network operation against a normal behavior is generated on the basis of the normal behavior information. The anomaly behavior based detection method has a great advantage in that the unknown attack can be detected.

However, the anomaly behavior based detection method has a drawback in that a normal user is falsely determined as being the network intrusion such as false-positive and at the same time, the known attack, which can be searched using the signature based detection method, cannot be erroneously searched. Furthermore, the anomaly behavior based detection method has a drawback in that since it takes a so long time to detect the network intrusion unlike the signature based detection method, the network intrusion cannot be protected.

Accordingly, a current network intrusion detection and prevention system employs all of two detection methods to consolidate a network security system. However, even in the current network intrusion detection and prevention system, the new network attack is not perfectly detected. In case where the unknown new attack occurs, the current network intrusion detection and prevention system has a drawback in that due to an insufficient association between the two detection methods, it cannot only detect the new attack within a short time, but also due to a very high detection rate, it cannot rapidly cope with a new Worm or a Distributed Denial of Service (DDOS) attack having a critical bad influence on the network, to cause a critical damage on the network.

SUMMARY OF THE INVENTION

Accordingly, the present invention is directed to a network intrusion detection and prevention system and a method thereof, which substantially obviate one or more problems due to limitations and disadvantages of the related art.

It is an object of the present invention to provide a network intrusion detection and prevention system and a method thereof in which unknown new Worm and Distributed Denial of Service (DDOS) network attack are rapidly cut off to prevent a critical damage on a network, and a newly created signature is applied to other fire walls or intrusion detection and prevention systems to maximize a security effect of the network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a network intrusion detection and prevention system, the system including: a signature based detecting device; an anomaly behavior based detecting device; and a new signature creating and verifying device disposed between the signature based detecting device and the anomaly behavior based detecting device, wherein if the anomaly behavior based detecting device detects network-attack-suspicious packets, the new signature creating and verifying device collects and searches the detected suspicious packets for common information, and then creates a new signature on the basis of the searched common information and at the same time, verifies whether or not the created new signature is applicable to the signature based detecting device, and then registers the created new signature to the signature based detecting device if it is determined that the created new signature is applicable.

In another aspect of the present invention, there is provided a network intrusion detection and prevention method in a new signature creating and verifying device installed between a signature based detecting device and an anomaly behavior based detecting device, the method including the steps of: if the anomaly behavior based detecting device detects network-attack-suspicious packets, collecting and storing the detected suspicious packets in the new signature creating and verifying device; searching for and analyzing a common portion of each of packet information on the basis of information of the collected packets in the new signature creating and verifying device; creating the new signature applicable to the signature based detecting device on the basis of each of common portion result information of a packet payload in the new signature creating and verifying device; constructing an actual detection system environment to verify whether or not the new signature is actually applicable to the signature based detecting device in the new signature creating and verifying device; testing the created new signature through a normal actual network traffic in the new signature creating and verifying device; and registering the tested new signature to the signature based detecting device in the new signature creating and verifying device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
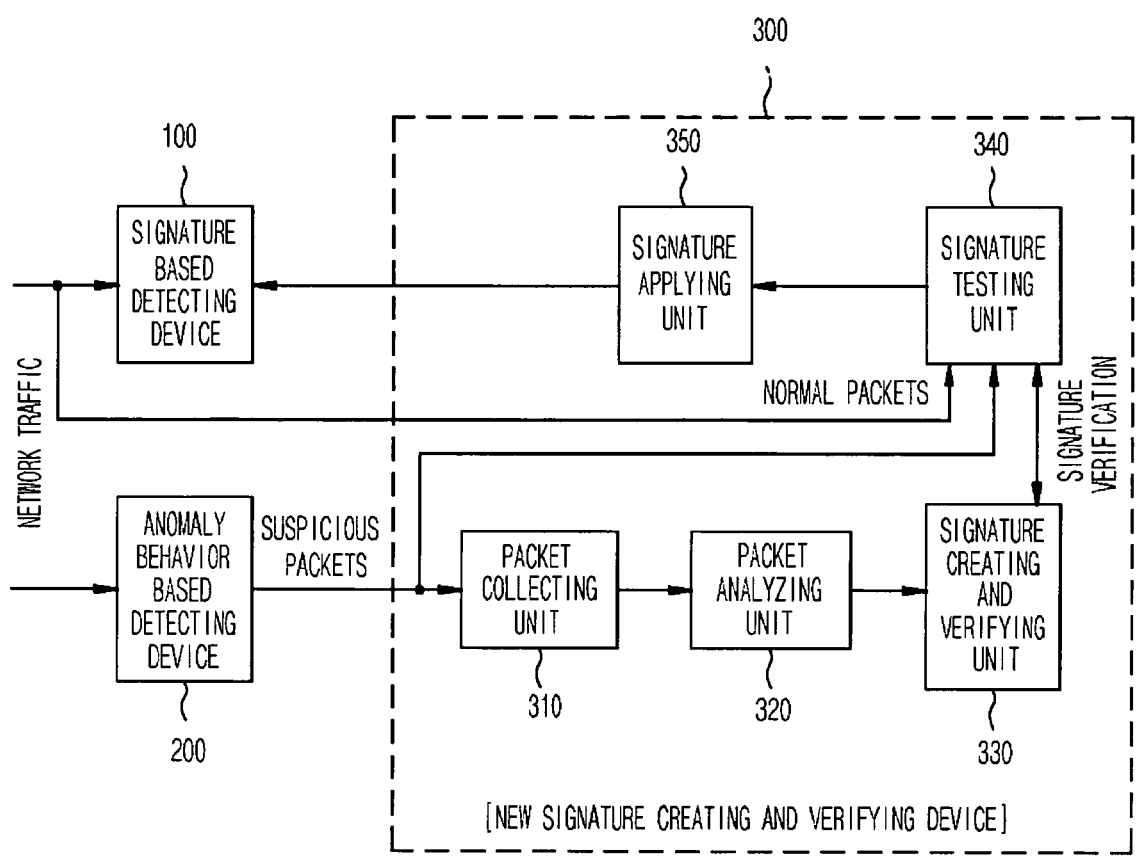
FIG. 1 is a block diagram illustrating a construction of a network intrusion detection and prevention system according to a preferred embodiment of the present invention.

FIG. 1 is a block diagram illustrating a construction of a network intrusion detection and prevention system according to a preferred embodiment of the present invention.

The network intrusion detection and prevention system includes a signature based detecting device 100, an anomaly behavior based detecting device 200, and a new signature creating and verifying device 300.

At this time, the new signature creating and verifying device 300 is disposed between the signature based detecting device 100 and the anomaly behavior based detecting device 200. If the anomaly behavior based detecting device 200 detects network-attack-suspicious packets, the new signature creating and verifying device 300 collects the detected suspicious packets to search the detected suspicious packets for common information. After that, the new signature creating and verifying device 300 creates a new signature on the basis of the common information and at the same time, verifies whether or not the created new signature is applicable to the signature based detecting device 100. Next, if it is determined that the created new signature is applicable to the signature based detecting device 100, the new signature creating and verifying device 300 registers the new signature to the signature based detecting device 100. As shown in FIG. 1, the new signature creating and verifying device 300 includes a packet collecting unit 310, a packet analyzing unit 320, a signature creating and verifying unit 330, a signature testing unit 340, and a signature applying unit 350.

Figure 2:
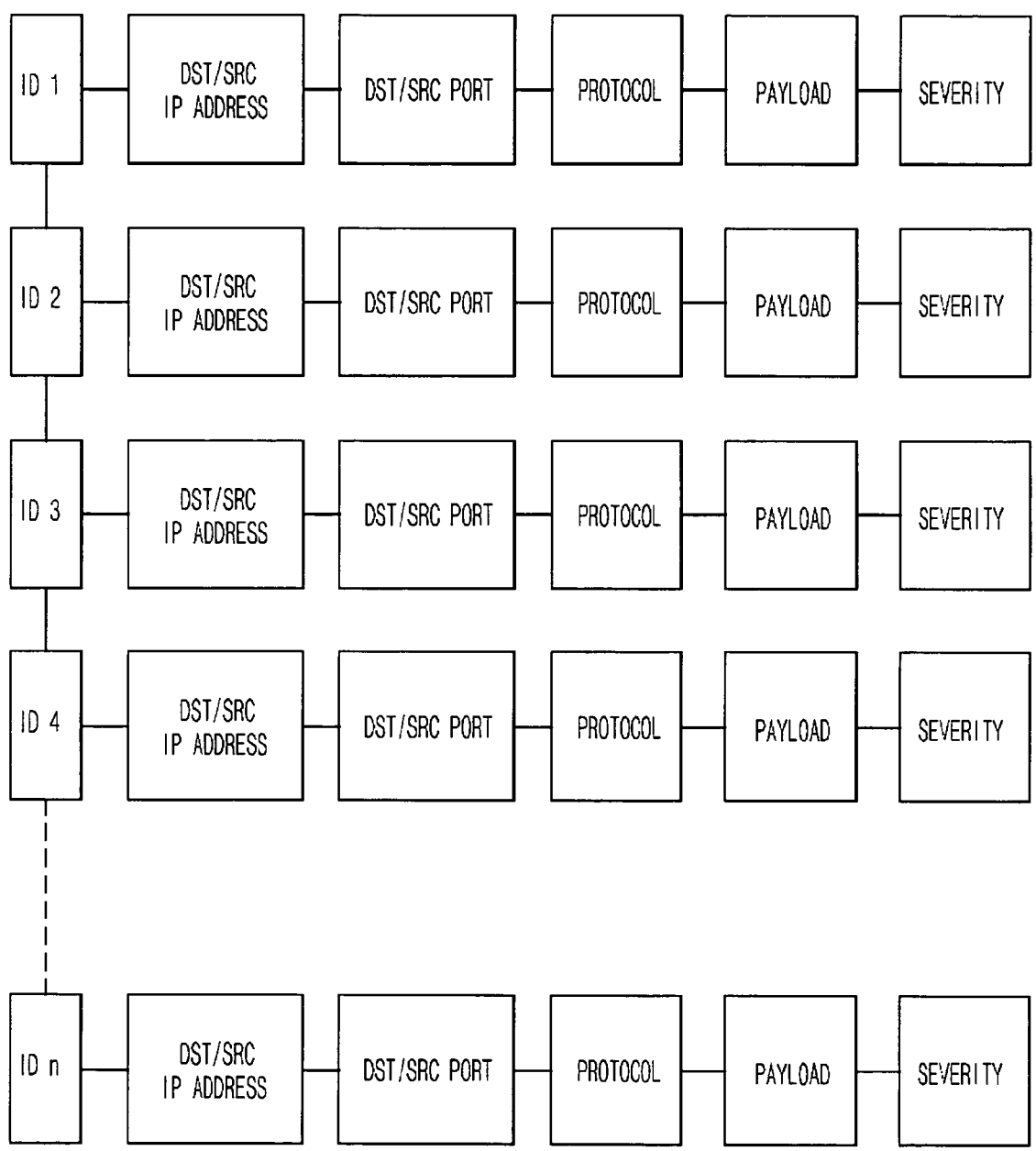
FIG. 2 is a view illustrating format of packets collected in a packet collecting unit of a new signature creating and verifying device in a network intrusion detection and prevention system of FIG. 1.

If the anomaly behavior based detecting device 200 detects the suspicious packets, the packet collecting unit 310 collects and stores the detected suspicious packets. At this time, as shown in FIG. 2, each of the stored suspicious packets includes destination/source IP address information, destination/source port number information, protocol information, data payload information, severity information indicating a severity degree of the detected result, and the like.

Figure 3:
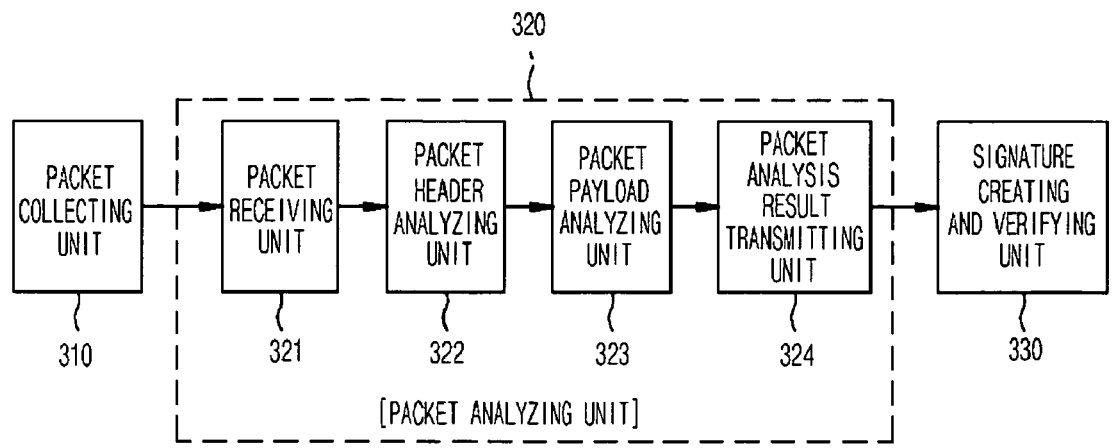
FIG. 3 is a functional block diagram illustrating a construction of a packet analyzing unit of a new signature creating and verifying device in a network intrusion detection and prevention system of FIG. 1.

Alternatively, the packet analyzing unit 320 searches for and analyzes common information of packet information on the basis of the collected packet information. As shown in FIG. 3, the packet analyzing unit 320 includes a packet receiving unit 321, a packet header analyzing unit 322, a packet payload analyzing unit 323, and a packet analysis result transmitting unit 324.

At this time, the packet receiving unit 321 receives packet data collected through the packet collecting unit 310 to transmit the received packet data to the packet header analyzing unit 322. The packet header analyzing unit 322 receives the packet data from the packet receiving unit 321 to analyze a destination/source IP address common portion, a destination/source port number common portion, a protocol common portion and a packet payload size common portion of the received packet data.

Further, the packet payload analyzing unit 323 receives an analyzed result of the packet data from the packet header analyzing unit 322 to separate packet payloads of the packet data every kind and search each kind of the packet payloads for a common portion. The packet analysis result transmitting unit 324 transmits common portion result information of packet information, which are analyzed through the packet payload analyzing unit 323, to the signature creating and verifying unit 330.

Figure 4:
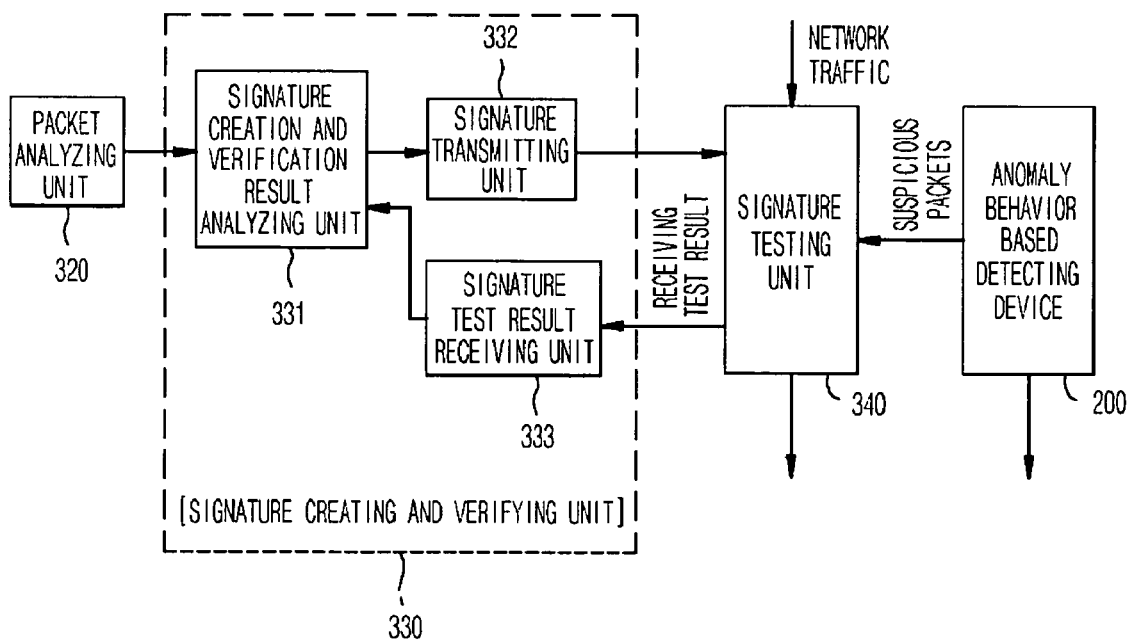
FIG. 4 is a functional block diagram illustrating a construction of a signature creating and verifying unit of a new signature creating and verifying device in a network intrusion detection and prevention system of FIG. 1.

Meanwhile, the signature creating and verifying unit 330 creates the signature applicable to the signature based detecting device 100, on the basis of the analyzed result using the packet payload analyzing unit 323, and then constructs an actual detection system environment to verify whether or not the new signature is actually applicable to the signature based detecting device 100. As shown in FIG. 4, the signature creating and verifying unit 330 includes a signature creation and verification result analyzing unit 331, a signature transmitting unit 332, and a signature test result receiving unit 333.

At this time, the signature creation and verification result analyzing unit 331 receives each of the common portion result information of the packet information from the packet analyzing unit 320, and then creates the new signature on the basis of the received common portion result information. After that, the signature creation and verification result analyzing unit 331 constructs the actual detection system environment to verify whether or not the new signature is actually applicable to the signature based detecting device 110.

Further, the signature transmitting unit 332 receives the new signature from the signature creation and verification result analyzing unit 331, and then transmits the received new signature to the signature testing unit 340. The signature test result receiving unit 333 receives a test result value for the new signature from the signature testing unit 340 to transmit the received test result value to the signature creation and verification result analyzing unit 331.

Meanwhile, the signature testing unit 340 tests the new signature, which is created through the signature creating and verifying unit 330, through a normal actual network traffic, by concurrently applying normal network packets introduced from the network and the suspicious packets detected using the anomaly behavior based detecting device 200.

Further, the signature applying unit 350 registers the tested new signature to the signature based detecting device 100.

Figure 5:
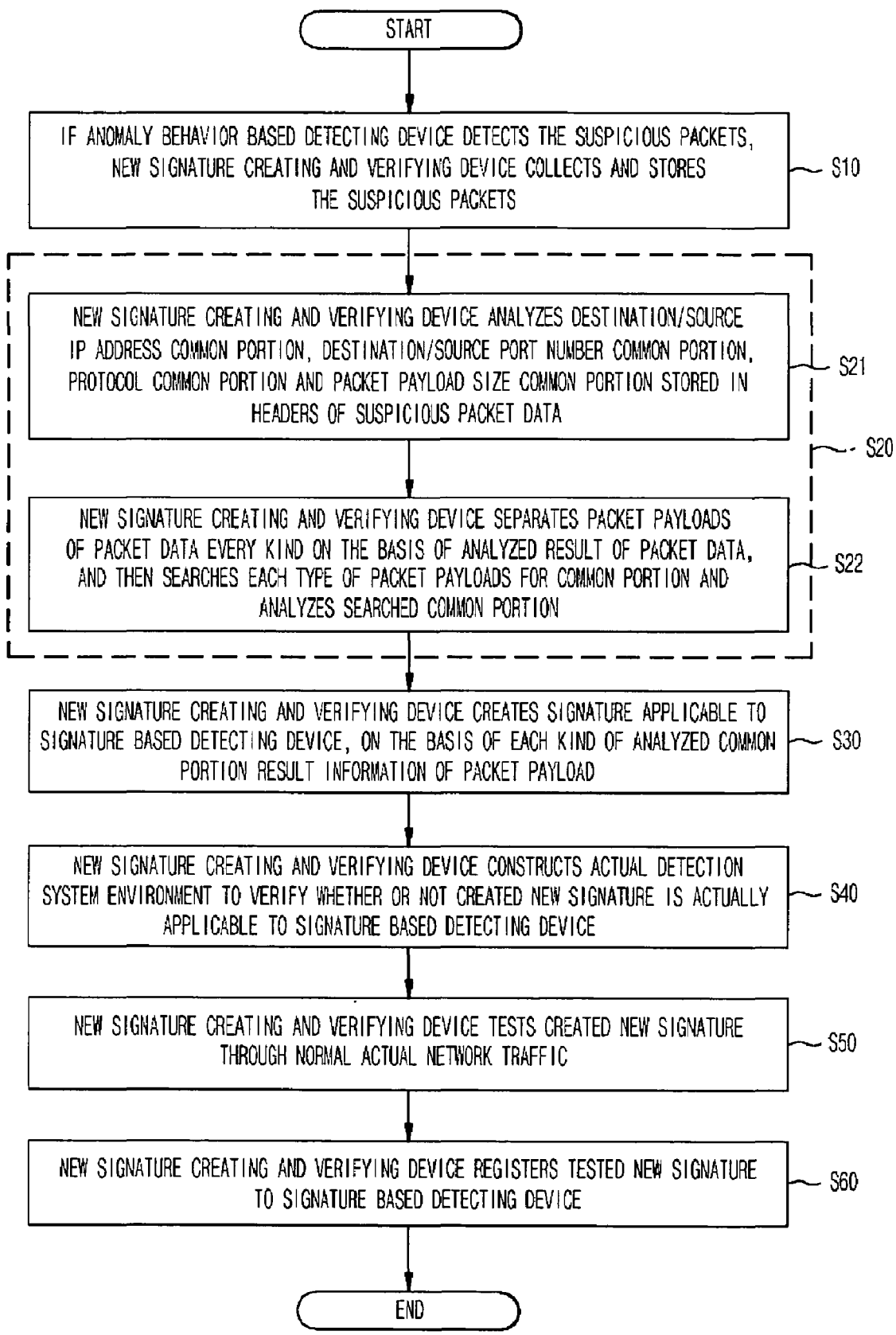
FIG. 5 is a flowchart illustrating a network intrusion detection and prevention method according to a preferred embodiment of the present invention.

Then, a network intrusion detection and prevention method is described with reference to FIG. 5 according to the preferred embodiment of the present invention having the above-construction.

First, if the anomaly behavior based detecting device 200 detects the suspicious packets, the new signature creating and verifying device 300 collects and stores the suspicious packets (S10). At this time, as shown in FIG. 2, the destination/source IP address information, the destination/source port number information, the protocol information, the data payload information, and the severity information for indicating the severity degree of the detected result are recorded in headers of the suspicious packets.

After that, the new signature creating and verifying device 300 searches each of the packet information for the common portion and analyzes the searched common portion on the basis of the collected packet information (S20). At this time, describing the S20 in detail, the new signature creating and verifying device 300 analyzes the destination/source IP address common portion, the destination/source port number common portion, the protocol common portion and the packet payload size common portion stored in the headers of the suspicious packet data (S21) Next, the new signature creating and verifying device 300 separates the packet payloads of the packet data every kind on the basis of the analyzed result of the packet data, and then searches each type of the packet payloads for the common portion and analyzes the searched common portion (S22).

After that, the new signature creating and verifying device 300 creates the signature applicable to the signature based detecting device 100, on the basis of each kind of analyzed common portion result information of the packet payload (S30).

Further, the new signature creating and verifying device 300 constructs the actual detection system environment to verify whether or not the created new signature is actually applicable to the signature based detecting device 100 (S40).

Next, the new signature creating and verifying device 300 tests the created new signature through the normal actual network traffic (S50). At this time, in the S50, the new signature creating and verifying device 300 tests the new signature by concurrently applying the normal network packets introduced from the network and the suspicious packets detected through the anomaly behavior based detecting device 200.

After that, the new signature creating and verifying device 300 registers the tested new signature to the signature based detecting device 100 (S60).

As described above, the inventive network intrusion detection and prevention system and method has an effect in that unknown new Worm and Distributed Denial of Service (DDOS) network attack are not only rapidly cut off to prevent a critical damage on the network, but also the created new signature is applied to other fire walls or intrusion detection and prevention systems to maximize a network security effect.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A network intrusion detection and prevention system, the system comprising:
   a signature based detecting device;
   an anomaly behavior based detecting device; and
   a new signature creating and verifying device disposed between the signature based detecting device and the anomaly behavior based detecting device,
   wherein the anomaly behavior based detecting device is configured to detect network-attack-suspicious packets;
   wherein the new signature creating and verifying device comprises a signature creating and verifying unit for creating a new signature applicable to the signature based detecting device on the basis of an analyzed result of the suspicious packets, and then constructing an actual detection system environment to verify whether or not the new signature is actually applicable to the signature based detecting device;
   wherein the new signature creating and verifying device is configured to collect, store, and search the detected suspicious packets for common information, and is further configured to create a new signature on the basis of the searched common information and determine that the created new signature is applicable to the signature based detecting device, and register the created new signature to the signature based detecting device; and
   wherein the new signature creating and verifying device includes a signature testing unit configured to test the created new signature through a normal actual network traffic concurrently applied with the detected suspicious packets to test the created new signature;
   wherein each of the stored suspicious packets has destination/source IP address information, destination/source port number information, protocol information, and data payload information.

2. The system of claim 1, wherein the new signature creating and verifying device comprises:
   a packet collecting unit for collecting and storing the detected suspicious packets;
   a packet analyzing unit for searching for and analyzing a common portion of each of packet information on the basis of the packet information collected through the packet collecting unit; and
   a signature applying unit for registering the tested new signature to the signature based detecting device.

3. The system of claim 1, wherein each of the stored suspicious packets has severity information indicating a severity degree of the detected result.

4. The system of claim 2, wherein the packet analyzing unit comprises:
   a packet receiving unit for receiving packet data collected through the packet collecting unit;
   a packet header analyzing unit for analyzing a destination/source IP address common portion, a destination/source port number common portion, a protocol common portion and a packet payload size common portion of the packet data received through the packet receiving unit;
   a packet payload analyzing unit for receiving the analyzed result of the packet data from the packet header analyzing unit to separate packet payloads of the packet data every kind, and then search each kind of the packet payloads for a common portion; and
   a packet analysis result transmitting unit for transmitting result information of the analyzed common portion to the signature creating and verifying unit.

5. The system of claim 2, wherein the signature creating and verifying unit comprises:
- a signature creation and verification result analyzing unit for receiving the result information from the packet analyzing unit, creating the new signature on the basis of the received result information, and constructing the actual detection system environment to verify whether or not the new signature is actually applicable to the signature based detecting device;
- a signature transmitting unit for receiving the new signature from the signature creation and verification result analyzing unit, and transmitting the received new signature to the signature testing unit; and
- a signature test result receiving unit for receiving a test result value for the new signature from the signature testing unit to transmit the received result value to the signature creation and verification result analyzing unit.

6. A network intrusion detection and prevention method in a new signature creating and verifying device installed between a signature based detecting device and an anomaly behavior based detecting device, the method comprising steps of:
- the anomaly behavior based detecting device detects network-attack-suspicious packets, collecting and storing the detected suspicious packets in the new signature creating and verifying device;
- searching for and analyzing a common portion of each of packet information on the basis of information of the collected packets in the new signature creating and verifying device;
- creating the new signature applicable to the signature based detecting device on the basis of each of common portion result information of a packet payload in the new signature creating and verifying device;
- constructing an actual detection system environment to verify whether or not the new signature is actually applicable to the signature based detecting device in the new signature creating and verifying device;
- testing the created new signature through a normal actual network traffic in the new signature creating and verifying device; and
- registering the tested new signature to the signature based detecting device in the new signature creating and verifying device;
- wherein the stored suspicious packets have destination/source IP address information, destination/source port number information, protocol information, and data payload information.

7. The method of claim 6, wherein the stored suspicious packets have severity information indicating a severity degree of the detected result, in their headers.

8. The method of claim 6, wherein the searching and analyzing of the common portion comprises the steps of:
- analyzing a destination/source IP address common portion, a destination/source port number common portion, a protocol common portion, and a packet payload size common portion stored in headers of the suspicious packets in the new signature creating and verifying device; and
- separating packet payloads of the packet data every kind on the basis of the analyzed result of the packet data, and searching each kind of the packet payloads for a common portion and analyzing the searched common portion in the new signature creating and verifying device.

9. The method of claim 6, wherein when the new signature creating and verifying device tests the created new signature, the suspicious packets detected through the anomaly behavior based detecting device and normal network packets are concurrently applied to test the created new signature.

* * * * *